(12) United States Patent
Hosaki

(10) Patent No.: US 12,526,543 B2
(45) Date of Patent: Jan. 13, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kenta Hosaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

(21) Appl. No.: 18/401,965

(22) Filed: Jan. 2, 2024

(65) Prior Publication Data

US 2024/0236521 A1 Jul. 11, 2024

(30) Foreign Application Priority Data

Jan. 5, 2023 (JP) .................................. 2023-000707

(51) Int. Cl.
*H04N 25/587* (2023.01)
*H04N 25/51* (2023.01)
*H04N 25/53* (2023.01)

(52) U.S. Cl.
CPC ........... *H04N 25/587* (2023.01); *H04N 25/51* (2023.01); *H04N 25/53* (2023.01)

(58) Field of Classification Search
CPC ...... H04N 25/587; H04N 25/51; H04N 25/53; H04N 23/71; H04N 23/72; H04N 23/73

USPC ........................................................ 348/362
See application file for complete search history.

(56) References Cited

U.S. PATENT DOCUMENTS

| 11,245,857 | B2 | 2/2022 | Sasaki | |
|---|---|---|---|---|
| 11,716,541 | B2* | 8/2023 | Saito | H04N 23/71 |
| | | | | 348/229.1 |
| 2021/0266446 | A1* | 8/2021 | Saito | H04N 25/535 |
| 2022/0311982 | A1* | 9/2022 | Kaneko | H04N 23/73 |
| 2022/0329719 | A1* | 10/2022 | Kaneko | G06T 7/50 |
| 2022/0394224 | A1* | 12/2022 | Fujiwara | H04N 23/71 |

FOREIGN PATENT DOCUMENTS

JP 6935272 B2 9/2021

\* cited by examiner

*Primary Examiner* — Lin Ye
*Assistant Examiner* — Chan T Nguyen
(74) *Attorney, Agent, or Firm* — Canon U.S.A., Inc. IP Division

(57) ABSTRACT

According to embodiments of the present disclosure, an image processing apparatus for processing image data captured by an image sensor configured to set exposure area by area includes a calculation unit configured to calculate an exposure value of each of the areas, and a correction unit configured to, in a case where the exposure value of each of the areas does not fall within a range based on a reference exposure value, correct the exposure value of each of the areas so that the exposure value approaches an upper limit or lower limit of the range.

10 Claims, 10 Drawing Sheets

FIG.3

| | | EXPOSURE TIME ID | 0 | 1 | 2 |
|---|---|---|---|---|---|
| | | EXPOSURE TIME [SEC] | 1/60 | 1/120 | 1/240 |
| GAIN ID | ANALOG GAIN [TIMES] | | | | |
| 0 | 8 | | 0 | 1 | 2 |
| 1 | 4 | | 1 | 2 | 3 |
| 2 | 2 | | 2 | 3 | 4 |
| 3 | 1 | | 3 | 4 | 5 |

FIG.7

| EV0 | EV1 | EV2 |
|---|---|---|
| EV3 | EV4 (PIXEL BLOCK OF INTEREST) | EV5 |
| EV6 | EV7 | EV8 |

IMAGE PROCESSING APPARATUS, IMAGE PROCESSING METHOD, AND STORAGE MEDIUM

BACKGROUND

Field of the Disclosure

The present disclosure relates to an image processing apparatus, an image processing method, and a storage medium for processing image data captured by an image sensor capable of setting exposure area by area.

Description of the Related Art

A camera's dynamic range is limited by the number of electrons to saturate an image sensor and bit precision after analog-to-digital (A/D) conversion. To expand the camera's dynamic range, various methods for partially modifying the exposure (exposure time and analog gain) of the image sensor have been developed. There is a technique for setting exposure for each of areas into which the entire light receiving area of the image sensor is divided, and correcting differences between the exposure settings of the respective areas by multiplying a digital signal obtained using the image sensor by area-specific correction gains calculated from the exposure settings.

However, in capturing an image with large luminance differences within a frame, differences in the exposure set area by area can increase to cause a difference in the image quality between the areas. A numerical value expressing the degree of exposure will be referred to as an exposure value. That a difference in the exposure is large means that a difference in the exposure values is large.

Japanese Patent No. 6935272 discusses a method for correcting exposure values so that a difference between the maximum and minimum exposure values of the areas within a frame decreases. Specifically, the exposure values are corrected by setting an allowable maximum exposure difference and performing processing for normalizing the difference between the maximum and minimum exposure values within a frame to the set maximum exposure difference.

However, if an image has a large luminance difference within the entire frame, the processing for reducing the difference between the maximum and minimum exposure values of the areas within the frame to a set value can increase the amounts of correction to the exposure values and reduce the effect of a high dynamic range. Moreover, since the processing is not based on a difference in the exposure values of adjoining areas, an image quality difference can appear at the border if the adjoining areas have a large difference in the exposure. There has also been an issue of increased changes in the image quality frame by frame if the frames have a difference in the exposure values.

SUMMARY

Embodiments of the present disclosure are directed to reducing a change in image quality due to a difference in the exposure values between adjoining areas or between frames.

According to embodiments of the present disclosure, an image processing apparatus for processing image data captured by an image sensor configured to set exposure area by area includes a calculation unit configured to calculate an exposure value of each of the areas, and a correction unit configured to, in a case where the exposure value of each of the areas does not fall within a range based on a reference exposure value, correct the exposure value of each of the areas so that the exposure value approaches an upper limit or lower limit of the range.

Further features of the present disclosure will become apparent from the following description of exemplary embodiments with reference to the attached drawings.

BRIEF DESCRIPTION OF THE DRAWINGS

FIG. 3 is a diagram for use in describing an exposure value.

FIG. 7 is a diagram illustrating exposure values around a pixel block of interest according to the second exemplary embodiment.

DESCRIPTION OF THE EMBODIMENTS

Figure 1:
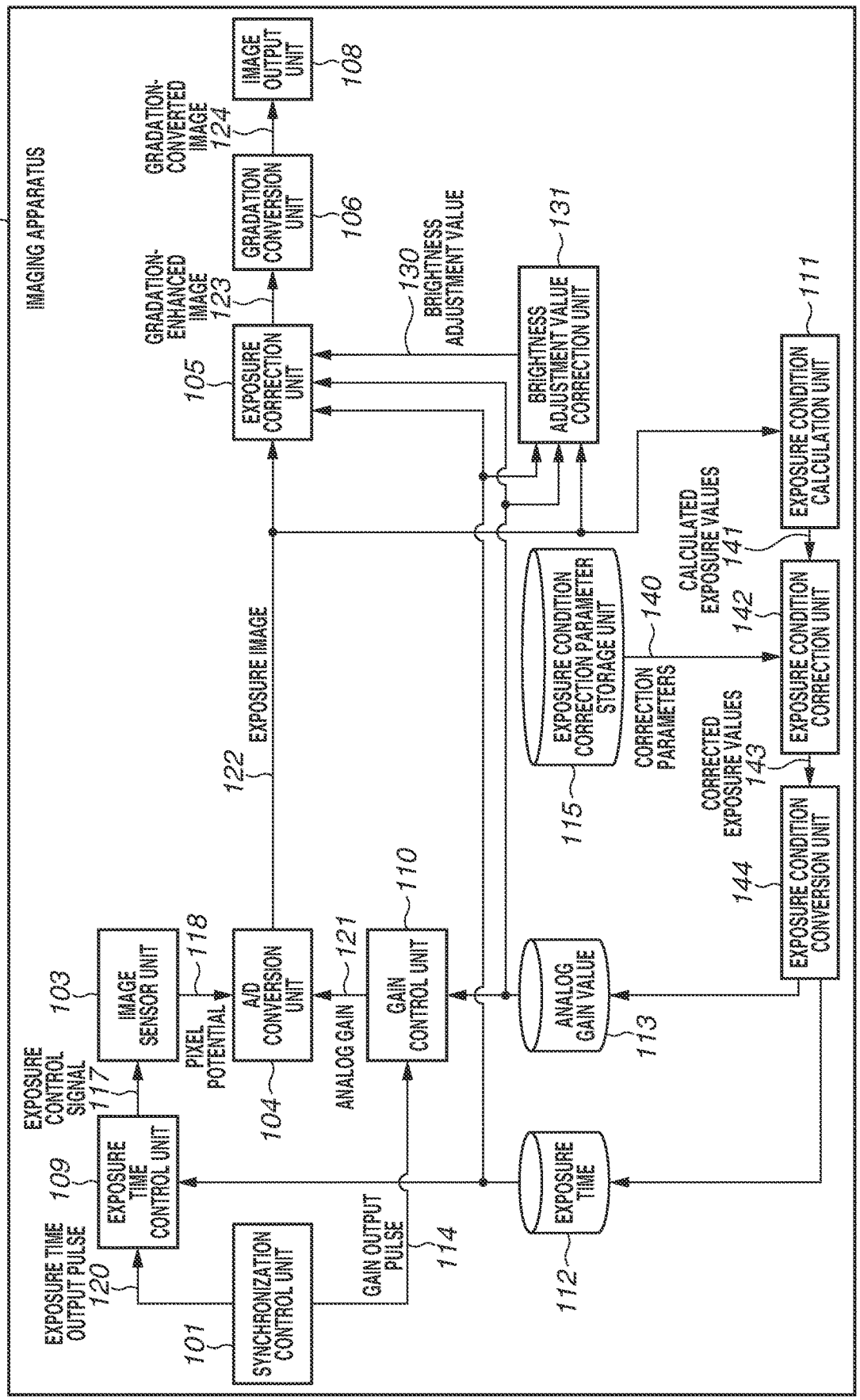
FIG. 1 is a diagram illustrating a schematic configuration of imaging apparatuses according to a first exemplary embodiment and a second exemplary embodiment.

Exemplary embodiments of the present disclosure will be described in detail below with reference to the attached drawings. The following exemplary embodiments are not intended to limit the technique of the present disclosure set forth in the claims, and all combinations of features described in the exemplary embodiments are not necessarily essential to the solving means of the technique of the present disclosure. Similar components or processes will be described with the same reference numerals.

FIG. 1 is a block diagram illustrating a schematic configuration example of an imaging apparatus 100 according to a first exemplary embodiment. The imaging apparatus 100 according to the present exemplary embodiment is an image processing apparatus including various configurations included in a typical imaging apparatus. For simplicity of illustration and description, FIG. 1 illustrates only main components according to the present exemplary embodiment.

The imaging apparatus 100 includes a synchronization control unit 101, an image sensor unit 103, an analog-to-digital (A/D) conversion unit 104, an exposure correction unit 105, and a gradation conversion unit 106. The imaging apparatus 100 further includes an image output unit 108, an exposure time control unit 109, a gain control unit 110, an exposure condition calculation unit 111, an exposure condition correction parameter storage unit 115, an exposure condition correction unit 142, an exposure condition conversion unit 144, and a brightness adjustment value correction unit 131.

The components of the imaging apparatus 100 according to the present exemplary embodiment will initially be outlined, starting at the image sensor unit 103.

The image sensor unit 103 includes an imaging area. The imaging area is divided into a plurality of areas called pixel blocks, and exposure can be set area by area. The image sensor unit 103 can be driven in units of pixel blocks (areas), and has a function of performing an exposure operation (charge accumulation) on the areas with respective different exposure times to obtain image data. Details of the pixel blocks will be described below. In the present exemplary embodiment, the exposure time of the image sensor 103 is set area by area using an exposure control signal 117 supplied from the exposure time control unit 109, and the image sensor unit 103 makes exposures with the exposure times set for the respective areas. The exposure control signal 117 is a signal for setting the exposure times of the respective areas of the image sensor unit 103. The image sensor unit 103 then reads a charge accumulated in each pixel over the exposure time set by the exposure control signal 117 area by area as a pixel potential 118 and outputs the pixel potential 118 to the A/D conversion unit 104.

The A/D conversion unit 104 A/D-converts the pixel potential 118 read from the image sensor unit 103 into a digital value. In the present exemplary embodiment, the gain control unit 110 sets an analog gain 121 corresponding to each of the foregoing areas to the A/D conversion unit 104. The A/D conversion unit 104 applies the analog gain 121 to the pixel potential 118 output from the image sensor unit 103 area by area, and then A/D-converts the resulting pixel potential into a digital value. An image formed with the digital signal resulting from the area-by-area application of the analog gain 121 and the A/D conversion by the A/D conversion unit 104 will be referred to as an exposure image 122. The exposure image 122 output from the A/D conversion unit 104 is transmitted to the brightness adjustment value correction unit 131, the exposure condition calculation unit 111, and the exposure correction unit 105.

The exposure condition calculation unit 111 calculates an exposure value of each area based on the exposure image 122 so that imaging is performed under an optimum condition, and outputs the result as a calculated exposure value 141. Specifically, the exposure condition calculation unit 111 calculates a histogram of pixel values in each pixel block based on a luminance distribution of the exposure image 122. If the pixel values fall more on the bright side, the exposure condition calculation unit 111 calculates the calculated exposure value 141 of the area to provide a setting value for capturing a darker image. If the pixel values fall more on the dark side, the exposure condition calculation unit 111 calculates the calculated exposure value 141 of the area to provide a setting value for capturing a brighter image. The exposure condition correction unit 142 corrects the calculated exposure values 141 to generate corrected exposure values 143 using correction parameters 140 stored in the exposure condition correction parameter storage unit 115. The exposure condition conversion unit 144 converts the corrected exposure values 143 into exposure times 112 and analog gain values 113, and updates the exposure times 112 and the analog gain values 113. The area-by-area values of the exposure times 112 are transmitted to the exposure time control unit 109 and the exposure correction unit 105. The area-by-area analog gain values 113 are transmitted to the gain control unit 110 and the exposure correction unit 105. The area-by-area values of the exposure times 112 and the area-by-area analog gain values 113 are also transmitted to the brightness adjustment value correction unit 131.

The concept of the exposure value will now be described with reference to FIG. 3. An exposure value is a numerical value indicating the degree of exposure that is a combination of an exposure time and an analog gain. The exposure time and the analog gain are both parameters related to the imaging condition. An exposure time identifier (ID) and a gain ID that constitute the condition for enabling brightest imaging both have an index of 0. The combination of index 0 of the exposure time ID (exposure time of 1/60 sec) and index 0 of the gain ID (analog gain of 8 times) constitutes the brightest imaging condition. By contract, the combination of the maximum indices of the exposure ID and the gain ID constitutes the darkest imaging condition. In FIG. 3, the exposure time is expressed in three levels, and the analog gain in four levels. Such combinations of exposure times and analog gains are just examples and not restrictive. The exposure value is expressed by the sum of the exposure time ID and the gain ID. The brightest imaging condition corresponds to an exposure value of 0.0, and the darkest imaging condition an exposure value of 5.0. The precision of the exposure value is not specified in particular and may be integral or decimal. In the present exemplary embodiment, the exposure value is described to have a decimal precision. The decimal expression has a bit width greater than that of the integer expression. A desirable decimal precision is determined based on the intended image quality. As will be described below in the description of the exposure condition conversion unit 144, the exposure value is rounded off or otherwise rounded into an integer before the conversion into the exposure time and the analog gain.

The brightness adjustment value correction unit 131 calculates a correction value for the exposure time 112 and the analog gain value 113. The brightness adjustment value correction unit 131 multiplies a brightness adjustment value 130 obtained from the exposure time 112 and the analog gain value 113 by the correction value to update the brightness adjustment value 130, and outputs the updated brightness adjustment value 130 to the exposure correction unit 105.

The synchronization control unit 101 generates a synchronized exposure time output pulse 120 and gain output pulse 114. The synchronization control unit 101 outputs the generated exposure time output pulse 120 to the exposure time control unit 109. The synchronization control unit 101 outputs the generated gain output pulse 114 to the gain control unit 110. The synchronization control unit 101 thereby controls synchronization of the processing of the exposure time control unit 109 with the processing of the gain control unit 110. The exposure time output pulse 120 is a signal for controlling timing when the exposure time control unit 109 outputs the exposure control signal 117 to the image sensor unit 103. The exposure time control unit 109 changes the exposure time for each given pixel block of the image sensor unit 103 by outputting the exposure control signal 117 to the image sensor unit 103 based on the exposure time output pulse 120. The gain output pulse 114 is a signal for controlling timing when the gain control unit 110 outputs the analog gain 121 to the A/D conversion unit 104. The gain control unit 110 changes the gain to be applied to the pixel potentials 118 in each given pixel block by outputting the analog gain 121 to the A/D conversion unit 104 based on the gain output pulse 114. In the present exemplary embodiment, the synchronization control unit 101 thus synchronously controls the operation of the exposure time control unit 109 and the gain control unit 110, whereby an exposure image 122 where the exposure time and the analog gain are changed as appropriate for each pixel block of the image sensor unit 103 can be output.

The exposure time control unit 109 generates the exposure control signal 117 for each area based on the exposure time output pulse 120 and the area-by-area values of the exposure times 112, and outputs the exposure control signal 117 to the image sensor unit 103. The exposure time corresponding to the exposure time 112 for each area can thereby be set to the image sensor unit 103 at appropriate timing.

The gain control unit 110 outputs the area-by-area analog gain values 113 to the A/D conversion unit 104 as the area-by-area analog gains 121 to be applied to the pixel potentials 118 in the respective areas of the image sensor unit 103 based on the pulse timing of the gain output pulse 114. The A/D conversion unit 104 thus applies the area-by-area analog gains 121 to the pixel potentials 118 in the respective corresponding areas before A/D conversion. The A/D-converted data is transmitted to the exposure correction unit 105 as the area-by-area exposure image 122.

The exposure correction unit 105 generates a gradation-enhanced image 123 by applying gradation enhancement processing based on the brightness adjustment value 130 to the exposure image 122 of each area transmitted from the A/D conversion unit 104. For example, the exposure correction unit 105 recognizes under which condition the input exposure image 122 of each area is captured based on the exposure time 112 of each area and the analog gain value 113 of each area, and corrects the exposure image 122 of each area using the brightness adjustment value 130 corresponding to the condition. For example, the exposure correction unit 105 generates a gradation-enhanced image 123 expressed in 17 bits by the gradation enhancement processing on the exposure image 122 of each area, expressed in 10 bits. The generated gradation-enhanced image 123 is transmitted to the gradation conversion unit 106.

The gradation conversion unit 106 performs gradation conversion on the gradation-enhanced image 123, and outputs the resulting gradation-converted image 124 to the image output unit 108. In the present exemplary embodiment, the gradation conversion refers to processing for generating, e.g., an 11-bit gradation-converted image 124 by gamma conversion on the 17-bit gradation-enhanced image 123. The gradation conversion processing according to the present exemplary embodiment is performed to reduce the data rate in the subsequent stages of processing. While in the present exemplary embodiment the exposure image 122 and the gradation-converted image 124 are described to have a bit length of 10 bits and 11 bits, respectively, the bit lengths are just examples and not limited thereto.

The image output unit 108 outputs the gradation-converted image 124 to a configuration at the subsequent stage of the imaging apparatus 100 or outside.

<Configuration of Image Sensor Unit 103>

Figure 2:
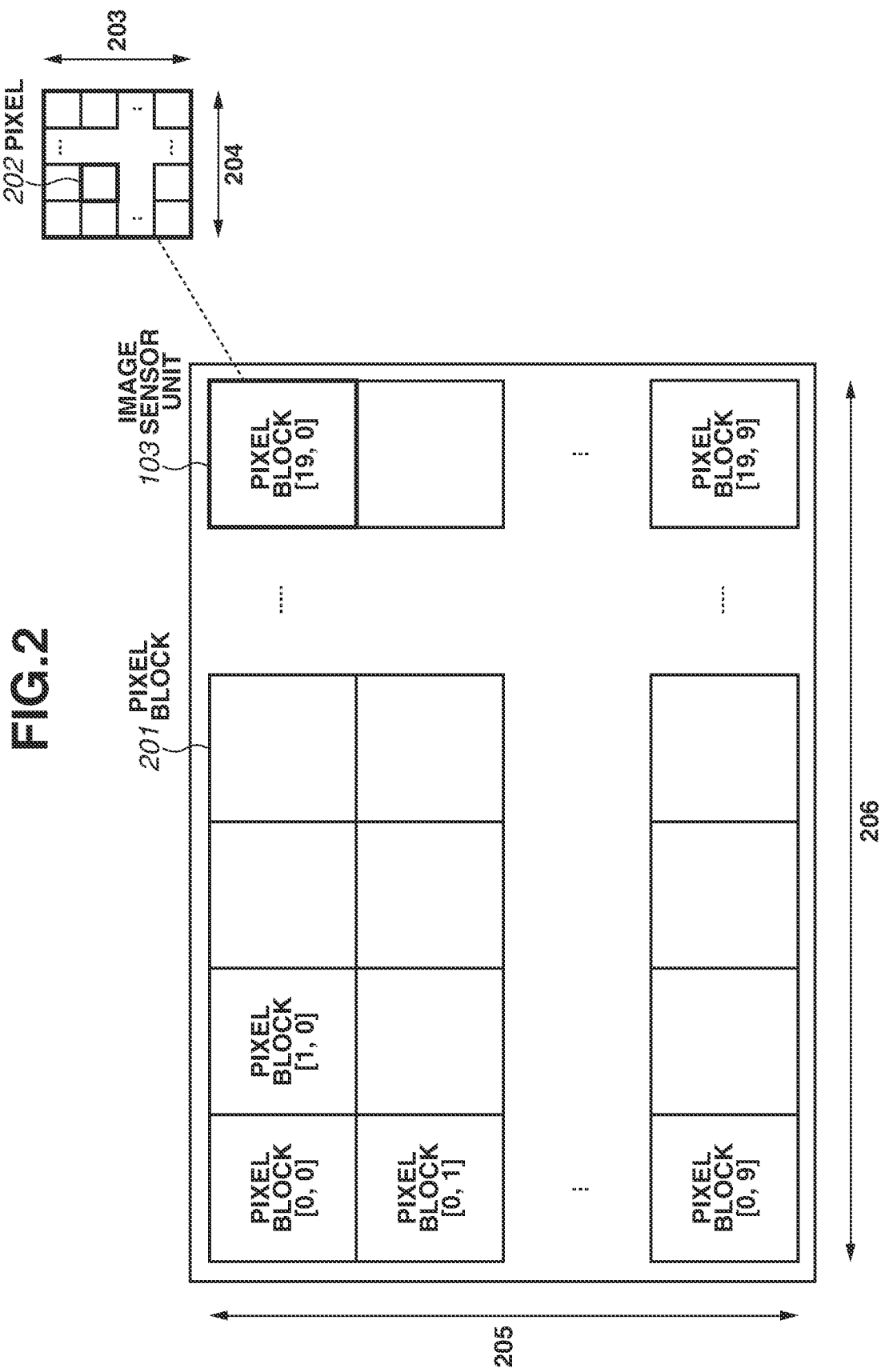
FIG. 2 is a diagram for use in describing areas of an image sensor unit.

FIG. 2 is a diagram for describing a configuration example of the image sensor unit 103. The imaging area of the image sensor unit 103 includes a plurality of pixel blocks 201. Each pixel block 201 includes a plurality of pixels 202. In the present exemplary embodiment, the number of pixels of the imaging area of the image sensor unit 103 in a width-206 direction (horizontal line direction) is 2000, and the number of pixels in a height-205 direction is 1000 (in other words, the number of horizontal lines in the vertical direction is 1000). The number of pixels of a pixel block 201 in a width-204 direction (horizontal line direction) is 100, and the number of pixels in a height-203 direction is 100 (100 horizontal lines in the vertical direction). In such a case, the number of pixel blocks 201 in the imaging area of the image sensor unit 103 is 20 in the horizontal direction and 10 in the vertical direction. Pixel blocks [0, 0] to [19, 9] written in the pixel blocks 201 of FIG. 2 indicate the positions of the respective pixel blocks 201 in the imaging area. The values in the brackets [ ] represent horizontal and vertical indexes of each pixel block 201 in the imaging area. For example, in FIG. 2, the pixel block 201 located at the top right of the image sensor unit 103 is pixel block [19, 0]. A set of pixel blocks indicated by the same vertical index will be referred to as a block row. Specifically, block row N includes pixel blocks [0, N] to [19, N]. For example, block row 5 includes pixel blocks [0, 5] to [19, 5]. The sizes (numbers of pixels in the vertical and horizontal directions) of the image sensor unit 103 and the pixel blocks 201 are not limited to the foregoing example. The shape and aspect ratio of the pixels 202 are not limited, either. For example, the pixels 202 may be rectangular instead of square. The pixel blocks 201 may consist of a single pixel 202 each.

In the present exemplary embodiment, the exposure time and the analog gain can be controlled with respect to each pixel block 201.

As employed herein, the exposure time corresponds to a time for which the pixels (light receiving elements) of the image sensor unit 103 accumulate charges during imaging. Suppose, for example, that the amount of light incident on the image sensor unit 103 is the same and the pixels are not saturated. In such a case, the longer the exposure time, the higher the pixel potential 118 and the brighter the captured image. In other words, if the amount of incident light is the same and pixel saturation is not taken into consideration, a brighter image can be captured with an exposure time of 1/60 sec than with an exposure time of 1/240 sec, for example.

The analog gain is again applied to the pixel potential 118 by the A/D conversion unit 104 during imaging. The greater the value of the analog gain, the greater the digital pixel value output from the A/D conversion unit 104 (digital value A/D-converted after the application of the gain).

Returning to FIG. 1, the configuration and operation of the imaging apparatus 100 according to the present exemplary embodiment will be described in detail.

The image sensor unit 103 captures an image with the exposure time controlled in units of pixel blocks 201 based on the exposure control signal 117. The image sensor unit 103 then outputs pixel potentials 118 based on the charges accumulated in the respective pixels.

The A/D conversion unit 104 applies the analog gain 121 set for each pixel block 201 of the image sensor unit 103 to the pixel potentials 118 output from the image sensor unit 103, then performs digital conversion, and outputs the exposure image 122. In the present exemplary embodiment, the exposure image 122 has 10-bit digital values. The analog gain 121 has four possible gain values ×1 time, ×2 times, ×4 times, and ×8 times.

<Operation of Exposure Condition Correction Unit 142>

Figure 4:
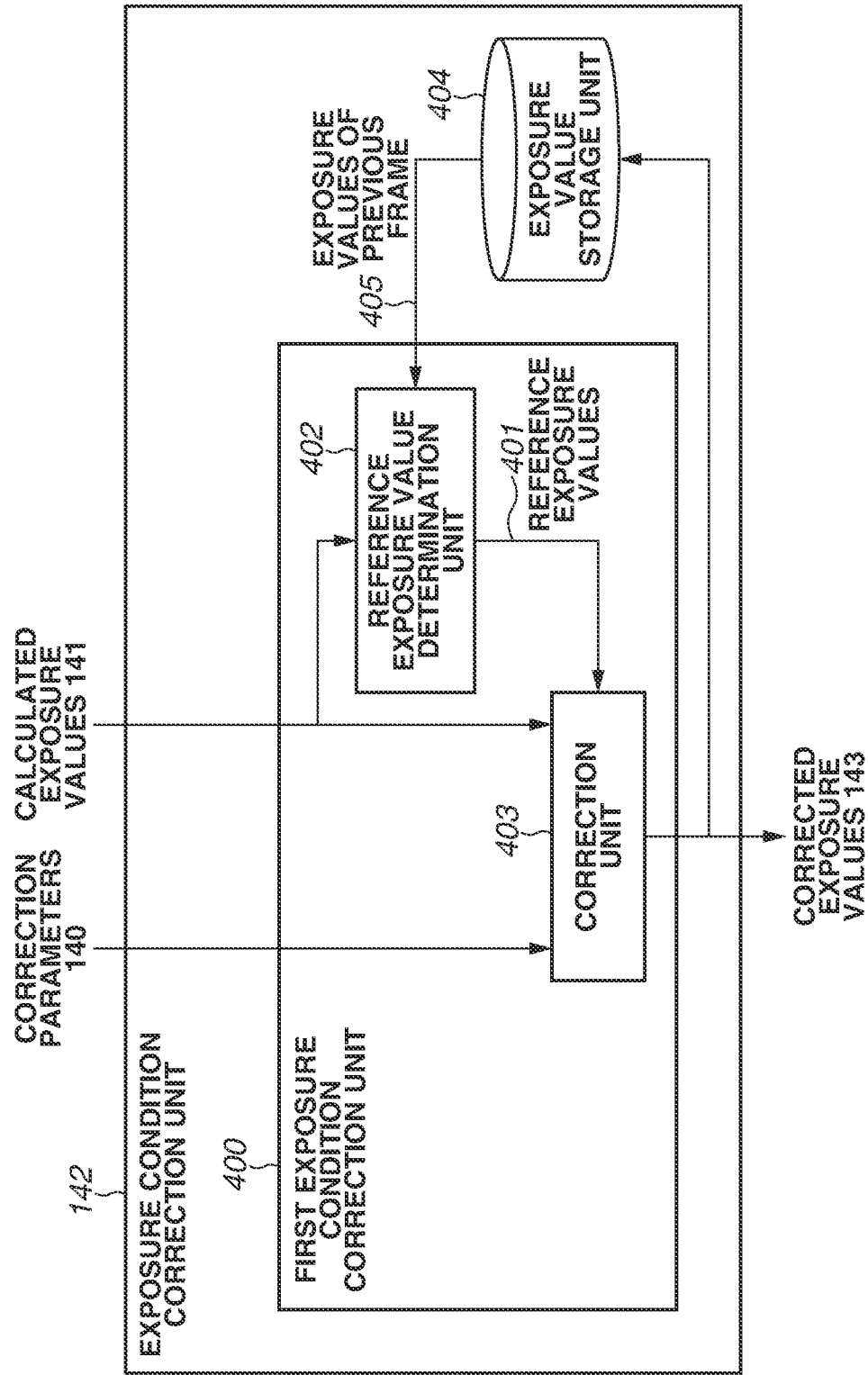
FIG. 4 is a block diagram of an exposure condition correction unit according to the first exemplary embodiment.

Next, the operation of the exposure condition correction unit 142 for correcting the calculated exposure values 141 that are the exposure values output from the exposure condition calculation unit 111 will be described with reference to FIG. 4. In FIG. 4, the exposure condition correction unit 142 includes a first exposure condition correction unit 400 and an exposure value storage unit 404. The first exposure condition correction unit 400 includes a reference exposure value determination unit 402 and a correction unit 403. The processing of each component may be implemented in any mode. The components may be implemented as hardware circuits, or implemented by software and processed by a central processing unit (CPU). Both implementation modes may be employed together.

The reference exposure value determination unit 402 initially obtains the calculated exposure values 141 of the respective pixel blocks 201 as EV[0, 0] to EV[19, 9], and determines values to be a reference for correction (referred to as reference exposure values 401). A pixel block of interest is moved in raster order from the top left to determine the reference exposure values 401 of all the pixel blocks 201. The reference exposure value 401 of a pixel block 201 at coordinates [x, y] will be denoted by EVB[x, y] and determined by Eq. (1). In Eq. (1), the reference exposure value 401 is determined by averaging the exposure values 405 of the previous frame used in capturing an image in the respective pixel blocks 201. In fact, the exposure value 401 is calculated only once a frame since the reference exposure values 401 for all the pixel blocks 201 have the same value according to Eq. (1). The lowest digit is appropriately rounded off, but may be rounded down.

$$EVB[x, y] = \frac{\sum_{v=0}^{9}\left(\sum_{h=0}^{19} EV[h, v]\right)}{10 \times 20} \quad (1)$$

Here, the reference exposure value 401 is calculated based on the calculated exposure values 141. Alternatively, the exposure values of the respective areas output in processing the previous frame and stored in the exposure value storage unit 404 (referred to as exposure values 405 of the previous frame) may be obtained as EVp1[0, 0] to EVp1[19, 9], and the reference exposure value 401 may be calculated using an equation similar to Eq. (1).

Next, the correction unit 403 corrects the calculated exposure values 141 (EV[0, 0] to EV[19, 9]) based on the correction parameters 140 and the reference exposure value 401, and outputs the results as corrected exposure values 143. The correction parameters 140 are a group of parameters to be used during correction, and include a processing flag F indicating whether to perform processing, an upper limit allowable width U and a lower limit allowable width L with respect to a reference exposure value 401, and a correction upper limit value UP indicating the upper limit value of the amount of correction to an exposure value. The correction parameters 140 are obtained from the exposure condition correction parameter storage unit 115. The method for storing the group of parameters in the exposure condition correction parameter storage unit 115 is not specified in particular. Initial values may be set upon start of operation. The group of parameters may be given from an external module. The correction unit 403 corrects the calculated exposure values 141 (EV[x, y]) into first corrected exposure values (EVC[x, y]) based on Eq. (2):

$$EVC[x, y] = \quad (2)$$
$$\begin{cases} EV[x, y] + UP & (EV[x, y] \le EVB[x, ] - L - UP) \\ EVB[x, y] - L & (EVB[x, y] - L - UP < EV[x, y] \le EVB[x, y] - L) \\ EV[x, y] & (EVB[x, y] - L < EV[x, y] \le EVB[x, y] + U) \\ EVB[x, y] + U & (EVB[x, y] + U < EV[x, y] \le EVB[x, Y] + U + UP) \\ EV[x, y] - UP & (EVB[x, y] + U + UP < EV[x, y]) \end{cases}$$

Figure 5:
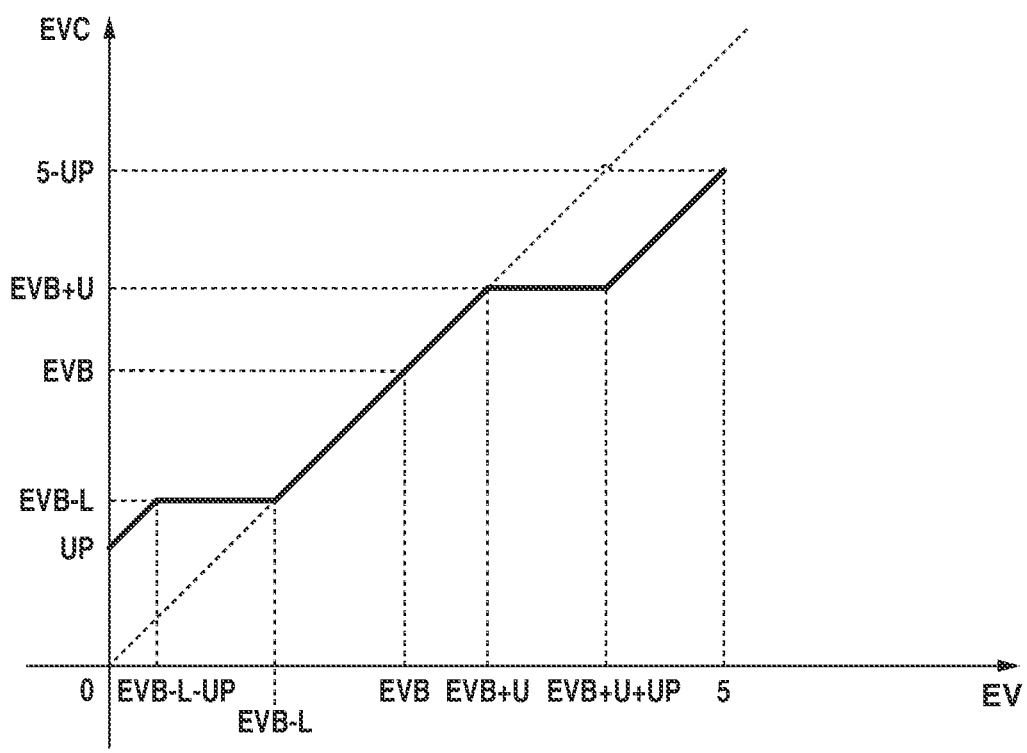
FIG. 5 is a graph of Eq. (2).

FIG. 5 is a graph of Eq. (2). The graph of FIG. 5 illustrates a relationship between a calculated exposure value 141 (EV) that is the input and a first corrected exposure value EVC that is the output, with the calculated exposure value 141 on the horizontal axis and the first corrected exposure value EVC on the vertical axis. The calculated exposure value 141 on the horizontal axis is illustrated with a minimum value of 0.0 and a maximum value of 5.0. FIG. 5 illustrates that if the calculated exposure value 141 is close to the reference exposure value 401, the input (EV)=the output (EVC) without correction, and if the calculated exposure value 141 is far from the reference exposure value 401, a correction is made. Eq. (2) and FIG. 5 will now be described. In the following description, the coordinate notations [x, y] of EV and EVC will be omitted.

Eq. (2) is classified into five cases. The third case from the top of Eq. (2) will initially be described. In this case, the calculated exposure value 141 (EV) that is the input is relatively close to the reference exposure value 401 (EVB) and no correction is made to the calculated exposure value 141 (EV). In other words, the case is where the calculated exposure value 141 (EV) is in a range greater than the value obtained by subtracting the lower limit allowable width L from the reference exposure value 401 (EVB) and less than or equal to the value obtained by adding the reference exposure value 401 (EVB) and the upper limit allowable width U. As employed herein, the value obtained by subtracting the lower limit value L from the reference exposure value 401 (EVB) (=EVB−L) will be referred to as a correction lower threshold. The value obtained by adding the reference exposure value 401 (EVB) and the upper limit allowable value U (=EVB+U) will be referred to as a correction upper threshold. Here, the calculated exposure value 141 (EV) is output as the first corrected exposure value EVC without correction.

On the other hand, if the calculated exposure value 141 (EV) does not fall within the foregoing range and is far from the reference exposure value 401 (EVB), a correction is made. The cases where the calculated exposure value 141 (EV) is greater than the reference exposure value 401 (EVB) will be described first. Basically, the first corrected exposure value EVC is corrected to the correction upper threshold (EVB+U) by subtracting the amount of correction from the calculated exposure value 141 (EV), with the amount of the calculated exposure value 141 (EV) exceeding the correction upper threshold (EVB+U) as the amount of correction. Note that the upper limit of the amount of correction is the correction upper limit value UP.

In the fourth case from the top of Eq. (2), i.e., where the calculated exposure value 141 (EV) is in a range greater than the correction upper threshold (EVB+U) and less than or equal to the value obtained by adding the correction upper threshold (EVB+U) and the correction upper limit value UP (EVB+U+UP), the amount of correction is EV−(EVB+U). In this range, the amount of correction is always less than or equal to the correction upper value UP. The amount of correction is thus EV−(EVB+U) as described above, and the first corrected exposure value EVC that is the resulting output value is the correction upper threshold (EVB+U). The second case from the top of Eq. (2) can be similarly considered and described, with the only difference being that the range is below the reference exposure value 401 (EVB). The first corrected exposure value EVB is the correction lower threshold (EVB−L). Like the second and fourth cases from the top of Eq. (2), if the calculated exposure value 141 (EV) is far from the reference exposure value 401 (EVB), the calculated exposure value 141 (EV) is thus corrected to a value closer to the reference exposure value 401 (EVB). Such a correction enables expression with image quality similar to at the reference exposure value 401 (EVB).

Next, in the fifth case from the top of Eq. (2), i.e., where the calculated exposure value 141 (EV) is greater than the value obtained by adding the correction upper threshold (EVB+U) and the correction upper limit value UP (EVB+U+UP), the amount of correction EV−(EVB+U) in this range exceeds the correction upper limit value UP. In such a case, the correction upper limit value UP is used as the amount of correction and subtracted from the calculated exposure value 141 (EV). The first corrected exposure value EVC that is the resulting output value is EV−UP. The first case at the top of Eq. (2) can be similarly considered and described, with the only difference being that the range is below the reference exposure value 401 (EVB). The first corrected exposure value EVC is EV+UP. Suppose, like the first and fifth cases from the top of Eq. (2), that the calculated exposure value 141 (EV) is even farther from the reference exposure value 401 (EVB). In such a case, the pixel block 201 is considered to have a brightness significantly different from that of a pixel block 201 having the reference exposure value 401 (EVB). The amount of correction is thus adjusted while correcting the calculated exposure value 141 (EV) to approach the reference exposure value 401 (EVB), whereby the high dynamic range effect on the image can be maintained while reducing a difference in the image quality from at the reference exposure value 401 (EVB).

With the first corrected exposure value EVC determined, the correction unit 403 determines a second corrected exposure value EVD according to Eq. (3), based on the processing flag F in the correction parameters 140. Specifically, if the processing flag F is 0, the correction unit 403 determines to not perform correction processing and simply determines the uncorrected calculated exposure value 141 (EV) as the second corrected exposure value EVD. On the other hand, if the processing flag F is 1, the correction unit 403 determines to perform correction processing, and determines the first corrected exposure value EVC as the second corrected exposure value EVD. The obtained second corrected exposure value EVD is output as the corrected exposure value 143. The processing of the first exposure condition correction unit 400 ends.

$$EVD[x, y] = f(x) = \begin{cases} EV[x, y] & (F = 0) \\ EVC[x, y] & (F = 1) \end{cases} \quad (3)$$

The corrected exposure value 143 output from the correction unit 403 is stored in the exposure value storage unit 404. The corrected exposure value 143 stored is read and used in processing the next frame.

When the processing of the exposure condition correction unit 142 ends, the exposure condition conversion unit 144 rounds off the corrected exposure value 143 output from the exposure condition correction unit 142 into an integer value and converts the obtained value into an exposure time 112 and an analog gain value 113. The conversion method is not specified in particular. An example of the method includes setting up a conversion table and converting the input corrected exposure value 143 into the exposure time 112 and the analog gain value 113 by referring to the set conversion table with the corrected exposure value 143 as an index.

The foregoing correction of the exposure values enables correction for reducing large differences in the pixel values of the pixel blocks 201 within a frame while maintaining the high dynamic range (HDR) effect.

Figure 6:
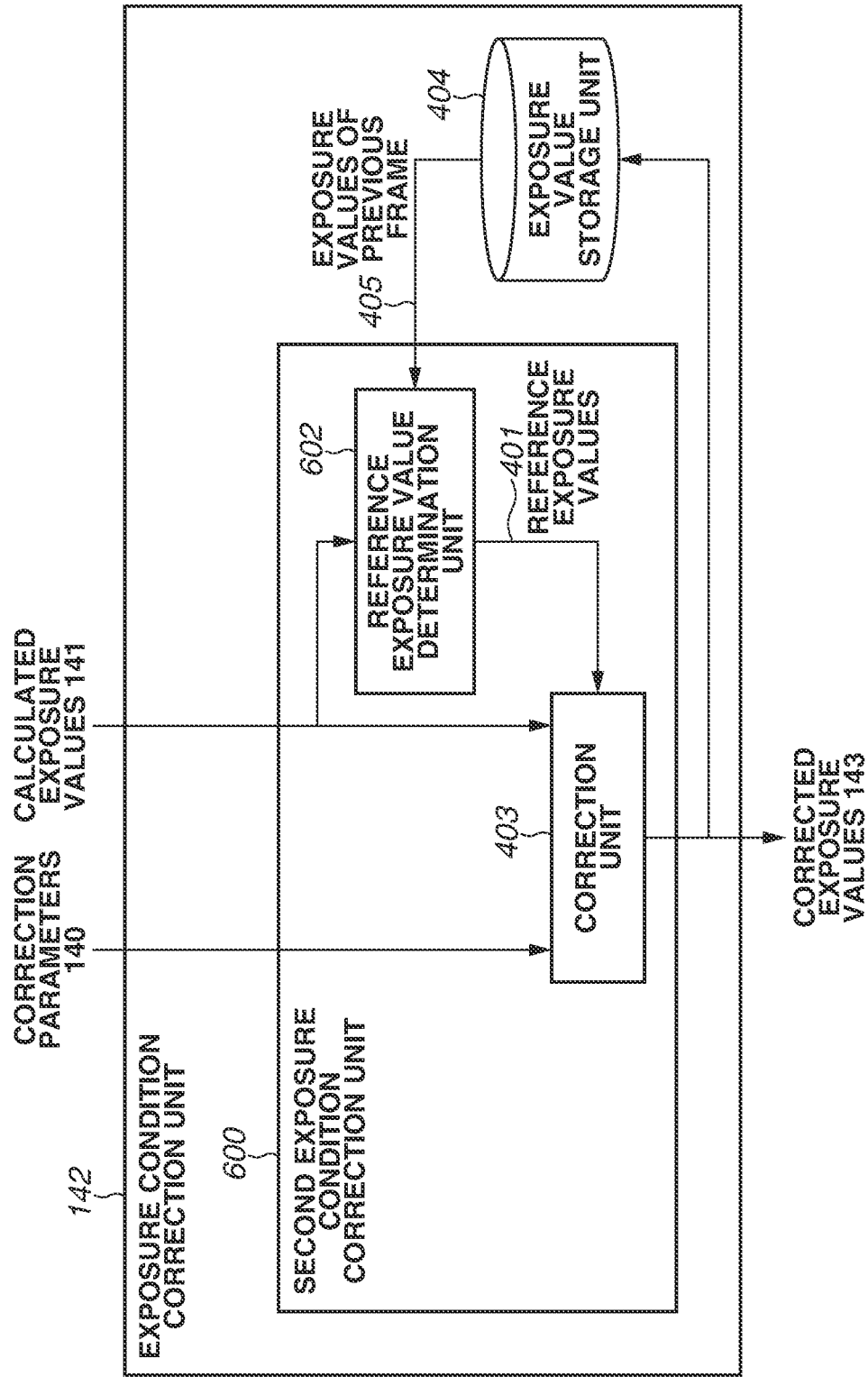
FIG. 6 is a block diagram of an exposure condition correction unit according to the second exemplary embodiment.

In the first exemplary embodiment, the method by which the reference exposure value determination unit 402 calculates the reference exposure value 401 from the exposure values 405 of the previous frame on the pixel blocks 201 within the frame has been described. In a second exemplary embodiment, a method for calculating the reference exposure value 401 from the exposure values of pixel blocks 201 adjoining the pixel block of interest (area of interest) will be described. FIG. 6 is a block diagram according to the second exemplary embodiment.

An exposure condition correction unit 142 includes a second exposure condition correction unit 600 and an exposure value storage unit 404. The second exposure condition correction unit 600 includes a reference exposure value determination unit 602 and a correction unit 403. Components operating similarly to in FIG. 4 are denoted by the same reference numerals.

Like the first exemplary embodiment, the reference exposure value determination unit 602 obtains calculated exposure values 141 (EV[0, 0] to EV[19, 9]) and determines reference exposure values 401. A pixel block of interest is moved in raster order from the top left to determine the reference exposure values 401 of all the pixel blocks 201. As illustrated in FIG. 7, with the exposure values of and around the pixel block of interest as EV0 to EV8, the reference exposure value determination unit 602 calculates the absolute values of second order differences in four directions about the pixel block of interest based on Eq. (4). If the pixel block of interest is located at x=5 and y=2, then EV0=V[4, 1], EV1=EV[5, 1], and EV2=EV[6, 1]. EV3=EV[4, 2], EV4=EV[5, 2], EV5=EV[6, 2], EV6=EV[4, 3], EV7=EV[5, 3], and EV8=EV[6, 3]. The four directions refer to an up-to-down direction, a left-to-right direction, a top-left-to-bottom-right direction, and a top-right-to-bottom-left direction. If the pixel block of interest is located in the top row like [2, 0], the exposure values EV0 to EV2 do not exist. In such a case, the non-existent exposure values are replaced with the exposure values of nearest pixel blocks 201. The same applies to the bottom row, the leftmost column, and the rightmost column.

$$\begin{cases} UD &= |EV1 + EV7 - 2EV4| \\ LR &= |EV3 + EV5 - 2EV4| \\ SL &= |EV0 + EV8 - 2EV4| \\ SR &= |EV2 + EV6 - 2EV4| \end{cases} \quad (4)$$

Next, the reference exposure value determination unit 602 searches the absolute values in the four directions for a minimum value, and averages the two exposure values on both sides of the pixel block of interest in the direction of the minimum value. Specifically, if the absolute value UD in the up-to-bottom direction is the minimum, the average is determined by Eq. (5). The lowest digit is appropriately rounded off, but may be rounded down.

$$EVB[x, y] = \frac{EV1 + EV7}{2} \quad (5)$$

If there are two or more directions of the minimum value, the reference exposure value determination unit 602 averages all the exposure values on both sides of the pixel block of interest in the respective directions. For example, if the absolute values UD and SR are the minimum, the average is given by Eq. (6):

$$EVB[x, y] = \frac{EV1 + EV7 + EV2 + EV6}{4}. \quad (6)$$

Similarly, if there are three directions of the minimum value, six exposure values are averaged. If there are four directions of the minimum value, eight exposure values are averaged. With the reference exposure value 401 thus obtained, the correction unit 403 determines the corrected exposure value 143 based on Eq. (2) like the first exemplary embodiment.

By such a procedure, the calculated exposure value 141 can be corrected with reference to the exposure values of the surrounding pixel blocks 201.

Aside from the foregoing method for determining a direction or directions based on the absolute values of second order differences and calculating the reference exposure value 401 from the average of the exposure values in the direction(s), the reference exposure value 401 can be calculated by other methods. For example, an average of the exposure values of the eight pixel blocks 201 around the pixel block of interest can be used as the reference exposure value 401. In such a case, the reference exposure value 401 can be determined using Eq. (7) without determining second order differences:

$$EVB[x, y] = \frac{EV0 + EV1 + EV2 + EV3 + EV5 + EV6 + EV7 + EV8}{8}. \quad (7)$$

Moreover, the foregoing two methods for determining the reference exposure value 401 may be performed and either one of the calculations may be selected. In such a case, a flag MODE is added to the correction parameters 140. If the flag MODE=0, the correction unit 403 uses the value calculated from the second order differences as the reference exposure value 401. On the other hand, if the flag MODE=1, the correction unit 403 obtains the reference exposure value 401 by using the average of the exposure values of the surrounding pixel blocks 201, expressed by Eq. (7) as the reference exposure value 401.

As another mode, the exposure values of the respective areas output during the processing of the previous frame and stored in the exposure value storage unit 404 (referred to as the exposure values 405 of the previous frame) are obtained as EVp1[0, 0] to EVp1[19, 9]. The reference exposure value determination unit 602 can then calculate the reference exposure values 401 using the obtained exposure values EVp1 [0, 0] to EVp1[19, 9]. If the pixel block of interest is located at x=5 and y=2, the nearby exposure values EV0 to EV8 illustrated in FIG. 7 are EV0=EVp1[4, 1], EV1=EVp1 [5, 1], EV2=EVp1[6, 1], EV3=EVp1[4, 2], EV4=EVp1[5, 2], EV5=EVp1[6, 2], EV6=EVp1 [4, 3], EV7=EVp1[5, 3], and EV8=EVp1[6, 3]. Using EV0 to EV8 thus obtained, the reference exposure value determination unit 602 performs the foregoing calculation to calculate the reference exposure value 401. Alternatively, the reference exposure value determination unit 602 may calculate the reference exposure values 401 by using both the reference exposure value 401 calculated using the calculated exposure values 141 (EV[0, 0] to EV[19, 9]) and the exposure values 405 of the previous frame (EVp1[0, 0] to EVp1[19, 9]). In such a case, for example, the reference exposure value determination unit 602 may average two reference exposure values 401, namely, a reference exposure value 401 calculated using the calculated exposure values 141 and a reference exposure value 401 calculated using the exposure values 405 of the previous frame to obtain a new reference exposure value 401. Alternatively, the reference exposure value determination unit 602 may select either one of the reference exposure value 401 calculated using the calculated exposure values 141 and the reference exposure value 401 calculated using the exposure values 405 of the previous frame based on the foregoing flag MODE in the correction parameters 140, and output the selected one.

As another mode, the obtained corrected exposure values 143 may be used as exposure values nearby. Specifically, corrected exposure values 143 corresponding to the exposure values EV0 to EV3 among the nearby exposure values EV0 to EV8 illustrated in FIG. 7 are already obtained from the current frame, and these corrected exposure values 143 are thus used as exposure values nearby. If the pixel block of interest is located at x=5 and y=2, corrected exposure values 143 EVD[4, 1], EVD[5, 1], EVD[6, 1], and EVD[4, 2] are already obtained. The nearby exposure values EV0 to EV8 illustrated in FIG. 7 are therefore EV0=EVD[4, 1], EV1=EVD[5, 1], EV2=EVD[6, 1], EV3=EVD[4, 2], EV4=EV[5, 2], EV5=EV[6, 2], EV6=EV[4, 3], EV7=EV[5, 3], and EV8=EV[6, 3]. Using EV0 to EV8 thus obtained, the reference exposure value determination unit 602 performs the foregoing calculation to calculate the reference exposure value 401.

In the present exemplary embodiment, the reference exposure value determination unit 602 refers to the exposure values of the 3×3, i.e., nine pixel blocks 201 about the pixel block of interest as the exposure values nearby. However, the size of pixel blocks to be referred to is not limited thereto. For example, 5×5, i.e., 25 pixel blocks 201 may be referred to. The size of pixel blocks to be referred to may be changed depending on the coordinates [x, y] of the pixel block of interest.

The foregoing correction of the exposure values can reduce a large difference in the exposure values at a border between adjoining pixel blocks.

Figure 8:
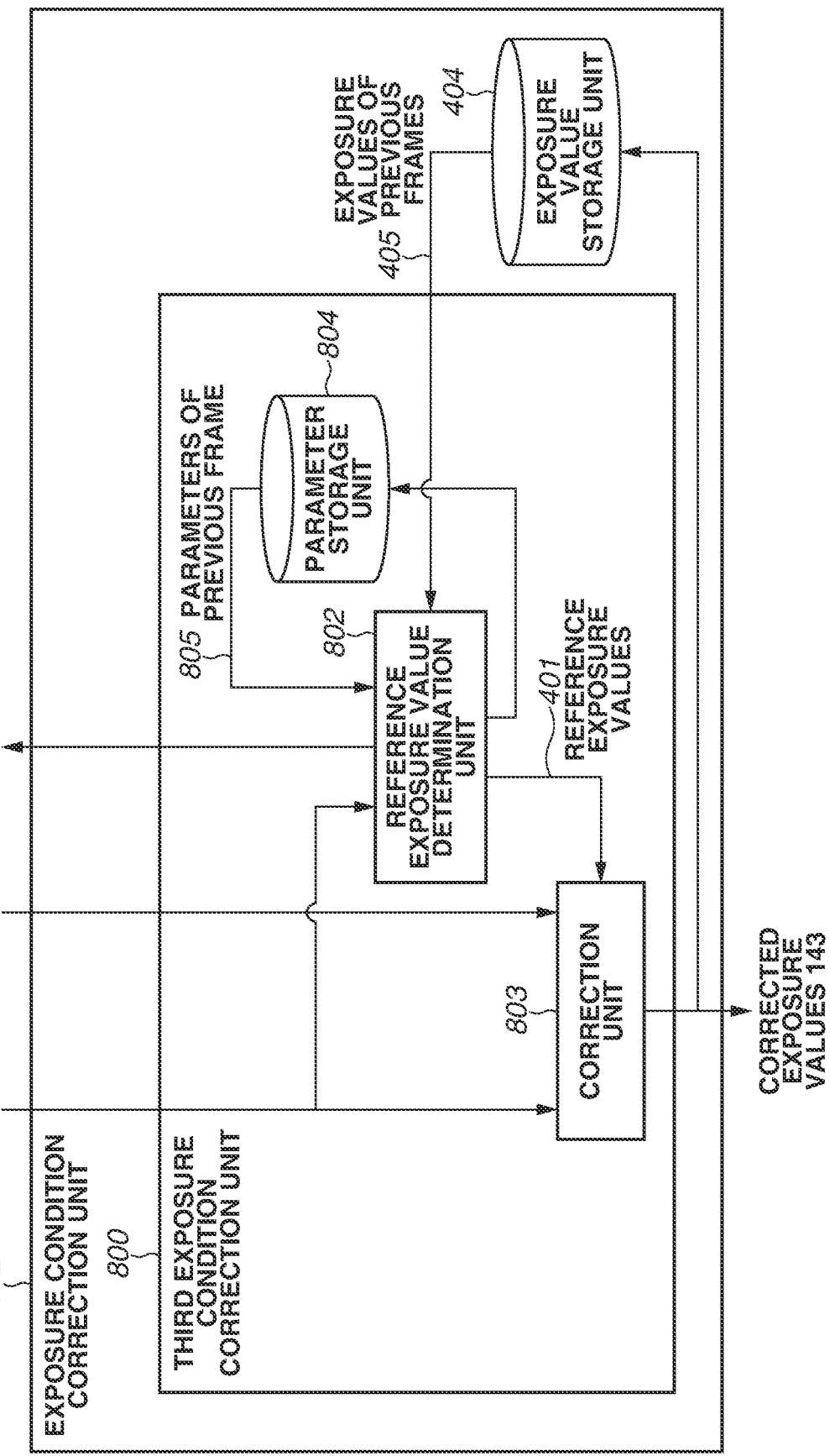
FIG. 8 is a block diagram of an exposure condition correction unit according to a third exemplary embodiment.
Figure 10:
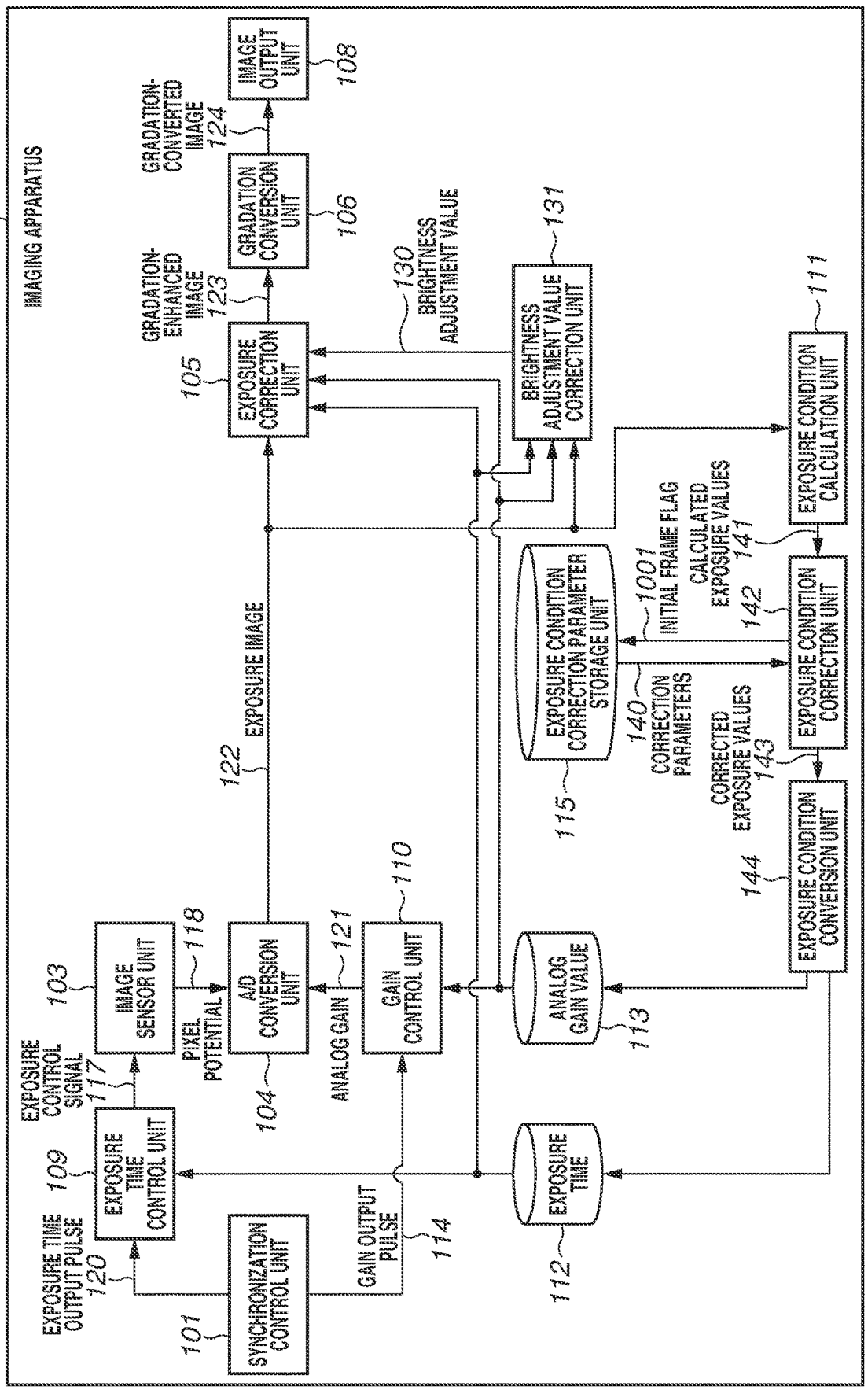
FIG. 10 is a diagram illustrating a schematic configuration of imaging apparatuses according to the third and fourth exemplary embodiments.

FIG. 10 is a block diagram illustrating a schematic configuration example of an imaging apparatus 100 according to a third exemplary embodiment. The only difference from FIG. 1 is that the exposure condition correction unit 142 updates an initial frame flag 1001 in the exposure condition correction parameter storage unit 115. The components are therefore denoted by the same respective reference numerals. FIG. 8 is a block diagram of the exposure condition correction unit 142 according to the third exemplary embodiment. In the present exemplary embodiment, a method for calculating a reference exposure value 401 from exposure values 405 of previous frames will be described as a method for determining the reference exposure value 401. The exposure condition correction unit 142 includes a third exposure condition correction unit 800 and an exposure value storage unit 404. The third exposure condition correction unit 800 includes a reference exposure value determination unit 802, a correction unit 803, and a parameter storage unit 804. Components operating similarly to in FIG. 4 are denoted by the same reference numerals.

Initially, the reference exposure value determination unit 802 obtains the exposure values 405 of the previous frame, or EVp1[0, 0] to EVp1[19, 9], and the exposure values of the previous but one frame output in processing the previous but one frame and stored in the exposure value storage unit 404, or EVp2[0, 0] to EVp2[19, 9]. The reference exposure value determination unit 802 further obtains correction parameters 140 including a flag INIT_FRAME indicating that the current frame is an initial frame, an initial value INIT_SPEED of the exposure time ID, and an initial value INIT_GAIN of the gain ID. The reference exposure value determination unit 802 further obtains parameters 805 of the previous frame stored in the parameter storage unit 804

(including a flag INIT_FRAMEp1 set on the previous frame and an initial exposure value EVf1 that is the initial value of the exposure value). A storage operation on the parameter storage unit 804 will be described below.

Next, the reference exposure value determination unit 802 determines reference exposure values 401. Since the reference exposure value determination unit 802 operates differently in the initial frame (first frame), the second frame, and the third and substrate frames, the respective cases will be described in order.

If the initial frame flag INIT_FRAME=1, the reference exposure value determination unit 802 determines that the current frame is the initial frame. In the case of the initial frame, the correction unit 803 to be described below does not perform correction processing. The reference exposure values 401 may therefore be invalid values, and the reference exposure value determination unit 802 determines that EVB[x, y]=0.0 for all the pixel blocks. Alternatively, to make the equations common, the reference exposure value determination unit 802 may perform calculation based on Eqs. (8) and (9) to be described below. In such a case, the exposure values 405 of the previous frames (EVp1 and EVp2) and the initial exposure value EVf1 having invalid values (arbitrary values) are used.

If the initial frame flag INIT_FRAME=0 and the initial frame flag on the previous frame INIT_FRAMEp1=1, the reference exposure value determination unit 802 determines that the current frame is the second frame. In the case of the second frame, the reference exposure value determination unit 802 calculates the reference exposure value 401 based on Eq. (8). Eq. (8) is an equation using an average of the exposure value EVp1 obtained in the previous frame (first frame) among the stored exposure values 405 of a plurality of previous frames and the initial exposure value EVf1 stored in the parameter storage unit 804 as the reference exposure value 401. The lowest digit is appropriately rounded off, but may be rounded down.

$$EVB[x, y] = \frac{EVp1[x, y] + EVf1}{2} \quad (8)$$

If the initial frame flag INIT_FRAME=0 and the initial frame flag on the previous frame INIT_FRAMEp1=0, the reference exposure value determination unit 802 determines that the current frame is the third frame or later. In the case of the third frame or later, the reference exposure value determination unit 802 calculates the reference exposure value 401 based on Eq. (9). Eq. (9) is an equation using an average of the exposure value of the previous frame, EVp1, and the exposure value of the previous but one frame, EVp2, among the exposure values 405 of previous frames in each area as the reference exposure value 401:

$$EVB[x, y] = \frac{EVp1[x, y] + EVp2[x, y]}{2}. \quad (9)$$

In such a manner, the reference exposure value determination unit 802 determines the reference exposure value 401 case by case.

After the determination of the reference exposure values 401, the reference exposure value determination unit 802 stores the initial frame flag INIT_FRAME and the initial exposure value EVf1 calculated from the initial value INIT_SPEED of the exposure time ID and the initial value INIT_GAIN of the gain ID into the parameter storage unit 804. The stored initial frame flag INIT_FRAME is read and used as the initial frame flag on the previous frame INIT_FRAMEp1 in processing the next frame. The stored initial exposure value EVf1 is also read and used in processing the next frame. As has been described with reference to FIG. 3, the exposure value is the sum of the exposure ID and the gain ID. The initial exposure value is thus determined by EVf1=INIT_SPEED+INIT_GAIN. In the present exemplary embodiment, the initial value INIT_SPEED of the exposure time ID, the initial value INIT_GAIN of the gain ID, and the initial exposure value EVf1 calculated from the initial values are described to be common for all the pixel blocks and do not change during processing even between frames. However, the initial value INIT_SPEED of the exposure time ID and the initial value INIT_GAIN of the gain ID may be set to different values from one pixel block to another. In such a case, the initial exposure value has different values for the respective pixel blocks, like EVf1[x, y]=INIT_SPEED[x, y]+INIT_GAIN[x, y]. The parameter storage unit 804 stores the initial exposure values EVf1[x, y] of all the pixel blocks.

If the initial frame flag INIT_FRAME=1, the reference exposure value determination unit 802 updates the value of the initial frame flag INIT_FRAME in the exposure condition correction parameter storage unit 115 (initial frame flag 1001) to 0. This enables the reference exposure value determination unit 802, in processing the second frame, to read the initial frame flag INIT_FRAME=0 and determine that the current frame is the second frame, combined with INIT_FRAMEp1 stored in the parameter storage unit 804. This also enables the correction unit 803 to determine that the current frame is the initial frame.

The correction unit 803 initially calculates the first corrected exposure values EVC according to Eq. (2), based on the reference exposure values 401 (EVB[x, y]) calculated by the reference exposure value determination unit 802, and the upper limit allowable width U, the lower limit allowable width L, and the correction upper limit value UP. Since Eq. (2) has been described above, a description thereof will be omitted.

With the first corrected exposure values EVC determined, the correction unit 803 determines the second corrected exposure values EVD according to Eq. (10), based on the processing flag F and the initial frame flag INIT_FRAME in the correction parameters 140. Specifically, if the processing flag F=0 or the initial frame flag INIT_FRAME=1, the correction unit 803 determines to not perform correction processing and simply determines the uncorrected calculated exposure values 141 (EV) as the second corrected exposure values EVD. On the other hand, if neither of the foregoing conditions is satisfied, i.e., the processing flag F=1 and the initial frame flag INIT_FRAME=0, the correction unit 803 determines to perform correction processing and determines the first corrected exposure values EVC as the second corrected exposure values EVD. The obtained second corrected exposure values EVD are output as the corrected exposure values 143, and the processing of the third exposure condition correction unit 800 ends. The correction unit 803 does not make correction when the initial frame flag INIT_FRAME=1 as well as when the processing flag F=0, since there is no available data on the previous frame and correction is unable to be made.

$$EVD[x, y] = \begin{cases} EV[x, y] & ((F = 0) \cup (\text{INIT\_FRAME} = 1)) \\ EVC[x, y] & (\text{Else}) \end{cases} \quad (10)$$

The determination of the reference exposure values 401 from the exposure values 405 of the previous frames as described above can prevent an excessive change in the exposure values between frames and reduce an abrupt change in the image quality.

In the present exemplary embodiment, the reference exposure values 401 are calculated from the exposure values 405 of the previous frames that are the exposure values of the past two frames. However, the number of frames is not limited to two, and the exposure values of more frames may be referred to.

As described above, according to the third exemplary embodiment, an abrupt change in the image quality can be reduced by using averages of the exposure values 405 of the previous frames as the reference exposure values 401.

In the first to third exemplary embodiments, respective different methods for deriving the reference exposure values 401 have been described. Such processes are independent of each other and do not necessarily need to be exclusively performed. More than one of the processes can be performed in parallel. A fourth exemplary embodiment describes a configuration for performing correction processing by connecting different exposure value corrections in series.

Figure 9:
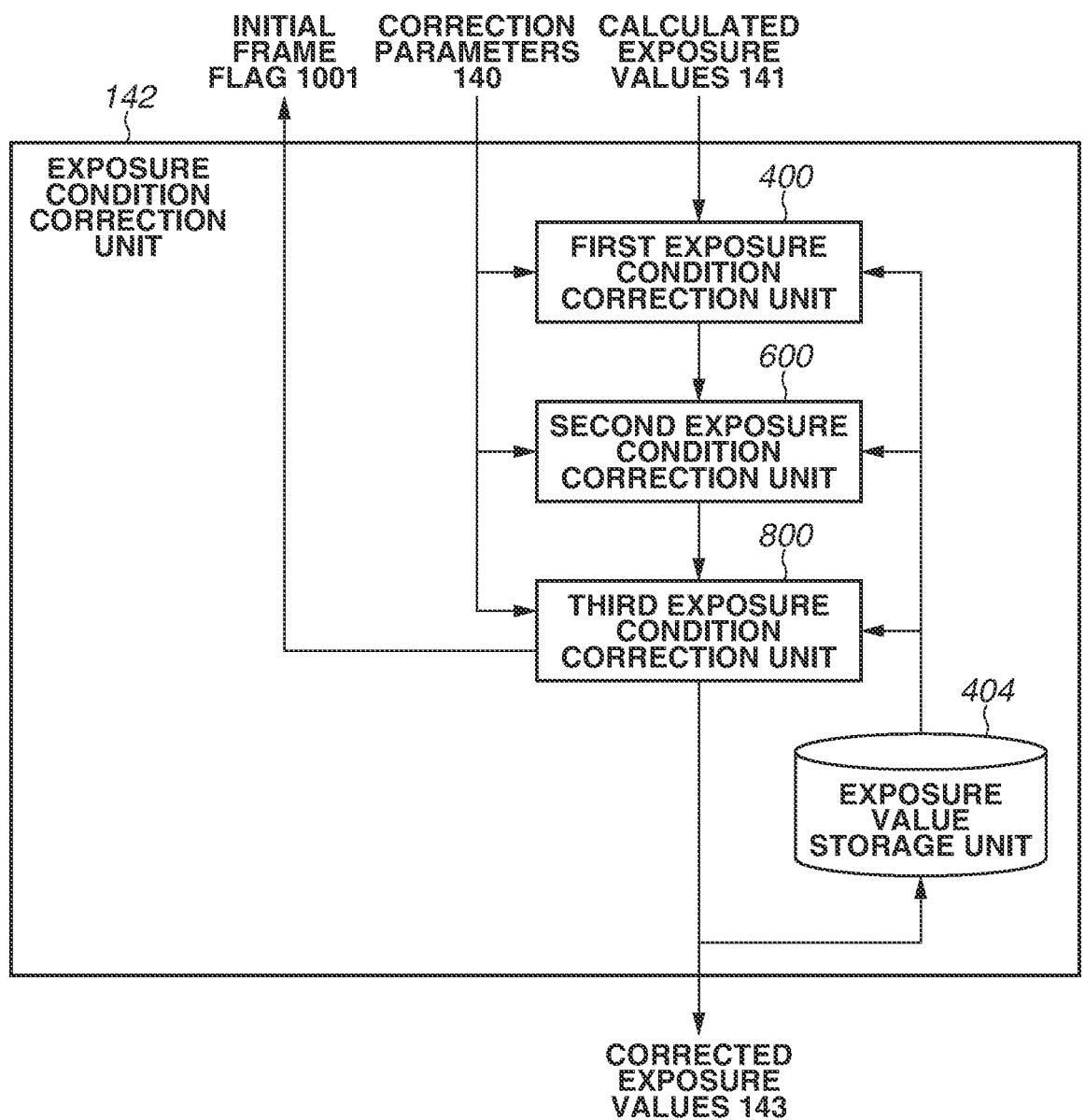
FIG. 9 is a block diagram of an exposure condition correction unit according to a fourth exemplary embodiment.

FIG. 9 is a block diagram of an exposure condition correction unit 142 according to the fourth exemplary embodiment. The exposure condition correction unit 142 includes a first exposure condition correction unit 400, a second exposure condition correction unit 600, a third exposure condition correction unit 800, and an exposure value storage unit 404. Corrected exposure values output from the third exposure condition correction unit 800 are stored in the exposure value storage unit 404. An imaging apparatus 100 has the same configuration as that of FIG. 10.

The first, second, and third exposure condition correction units 400, 600, and 800 can set respective different parameters. Specifically, the first exposure condition correction unit 400 obtains a processing flag F1 for the first exposure condition correction unit 400, an upper limit allowable width U1 and a lower limit allowable width L1 with respect to a reference exposure value 401, and a correction upper limit value UP1. Similarly, the second exposure condition correction unit 600 obtains a processing flag F2 for the second exposure condition correction unit 600, an upper limit allowable width U2 and a lower limit allowable width L2 with respect to the reference exposure value 401, and a correction upper limit value UP2. The third exposure condition correction unit 800 obtains a processing flag F3 for the third exposure condition correction unit 800, an upper limit allowable width U3 and a lower limit allowable width L3 with respect to the reference exposure value 401, and a correction upper limit value UP3. The first, second, and third exposure condition correction units 400, 600, and 800 obtain the same data on the exposure values of the previous frame, EVp1[0, 0] to EV1[19, 9], among the exposure values 405 of the previous frames. Only the third exposure condition correction unit 800 obtains the exposure values of the previous but one frame, EVp2[0, 0] to EVp2[19, 9], among the exposure values 405 of the previous frames.

In making corrections using Eq. (2), the respective correction units 403 calculate the corrected exposure values 143 using the obtained parameters.

The series connection of the exposure condition correction units 400, 600, and 800 intended for different purposes enables corrections with effects corresponding to the respective purposes. The processing order of the first, second, and third exposure condition correction units 400, 600, and 800 is not specified in particular, and any of the processes may be performed first.

The processing of only some of the first to third exposure condition correction units 400, 600, and 800 may be implemented. For example, only the second and third, two exposure condition correction units 600 and 800 may be implemented. Even in such a case, which processes to implement and in what order to perform the processes are not specified in particular.

As described above, the serial connection of a plurality of correction processes intended for different purposes enables corrections for the respective purposes in a composite manner.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-000707, filed Jan. 5, 2023, which is hereby incorporated by reference herein in its entirety.

What is claimed is:

1. An image processing apparatus for processing image data captured by an image sensor configured to set exposure area by area, the image processing apparatus comprising:
   one or more processors; and
   at least one memory storing executable instructions, which when executed by the one or more processors, cause the image processing apparatus to perform operations comprising:
      calculating an exposure value of each of the areas; and
      in a case where the exposure value of each of the areas does not fall within a range based on a reference exposure value, correcting the exposure value of each of the areas so that the exposure value approaches an upper limit or lower limit of the range, wherein the reference exposure value is an average of the exposure values of areas adjoining an area of interest in a direction in a previous frame, an absolute value of a second order difference of the exposure values of the areas in the direction being minimum.

2. The image processing apparatus according to claim 1, wherein the upper limit of the range is calculated based on the reference exposure value and an upper limit allowable width, and wherein the lower limit of the range is calculated based on the reference exposure value and a lower limit allowable width.

3. The image processing apparatus according to claim 1, wherein an upper limit of an amount of correction made to the exposure value of each of the areas by the correcting is a preset correction upper limit value.

4. The image processing apparatus according to claim 1, wherein the reference exposure value is an average of the exposure values of a plurality of areas in a previous frame.

5. The image processing apparatus according to claim 1, wherein the reference exposure value is an average of the exposure values of areas adjoining the area of interest in the previous frame.

6. The image processing apparatus according to claim 1, wherein the reference exposure value is an average of the exposure values of a plurality of previous frames.

7. The image processing apparatus according to claim 6, wherein the number of previous frames is at least two.

8. The image processing apparatus according to claim 1, wherein the correcting includes:

calculating the reference exposure value using respective different methods, and correcting the exposure value of each of the areas.

9. An image processing method for processing image data captured by an image sensor configured to set exposure area by area, the image processing method comprising:

calculating an exposure value of each of the areas; and in a case where the exposure value of each of the areas does not fall within a range based on a reference exposure value, correcting the exposure value of each of the areas so that the exposure value approaches an upper limit or lower limit of the range, wherein the reference exposure value is an average of the exposure values of areas adjoining an area of interest in a direction in a previous frame, an absolute value of a second order difference of the exposure values of the areas in the direction being minimum.

10. A non-transitory computer-readable storage medium storing a program causing an image processing apparatus for processing image data captured by an image sensor configured to set exposure area by area to execute an image processing method, the image processing method comprising:

calculating an exposure value of each of the areas; and in a case where the exposure value of each of the areas does not fall within a range based on a reference exposure value, correcting the exposure value of each of the areas so that the exposure value approaches an upper limit or lower limit of the range, wherein the reference exposure value is an average of the exposure values of areas adjoining an area of interest in a direction in a previous frame, an absolute value of a second order difference of the exposure values of the areas in the direction being minimum.

* * * * *